United States Patent Office 3,575,820
Patented Apr. 20, 1971

3,575,820
PROCESS FOR SEPARATING ORTHO-ISOMERS FROM DIISOCYANATE MIXTURES BY DISTILLATION WITH ALUMINUM OXIDE
Wilhelm J. Schnabel, Branford, and Ehrenfried H. Kober, Hamden, Conn., assignors to Olin Corporation
No Drawing. Filed Nov. 22, 1968, Ser. No. 778,344
Int. Cl. B01d 3/34; C07c 69/00
U.S. Cl. 203—30                                                4 Claims

ABSTRACT OF THE DISCLOSURE

Removal of ortho-isomers from tolylene diisocyanate mixtures is effected by incorporating aluminum oxide with said mixtures and subsequently distilling to recover non-vicinal tolylene diisocyanate. The aluminum oxide functions as a selective polymerization catalyst for the ortho-isomers, which polymerize to solid, non-distillable polymers.

---

This invention relates to an improved process for the preparation of tolylene diisocyanate. More particularly, this invention relates to a process for removing ortho-isomers of tolylene diisocyanate from tolylene diisocyanate reaction mixtures.

Tolylene diisocyanate is a commercially available material particularly useful in the preparation of polyurethane foams. Although tolylene diisocyanate can be prepared by a variety of methods, commercial processes prefer phosgenation of tolylene diamines as a practical route to the corresponding diisocyanates. Thus, a mixture of tolylene diamines is dissolved in an inert solvent and reacted with phosgene at elevated temperatures to provide the desired diisocyanates. The resulting reaction mixture is then purged to remove excess phosgene and gaseous by-products prior to recovering the tolylene diisocyanates by distillation.

While providing the desired tolylene diisocyanate, the aforementioned process has presented problems in commercial operations which previous researchers have attempted to define and obviate. Thus, it has been recognized that the presence of ortho-isomers of tolylene diamine in the starting material yields cyclic ureas, thereby contaminating the product and decreasing the yield. U.S. Patent 3,317,606 discloses a method for separating these ortho-, or vicinal tolylene diamines from the non-vicinal isomers by an extraction technique.

Recently, it has been established that the formation of turbidity in tolylene diisocyanate is caused by the presence of ortho-isomers of tolylene diisocyanate, which polymerize gradually to insoluble, haziness producing materials. Thus, in the aforementioned commercial process, the tolylene diamines which are phosgenated generally contain some of the ortho-isomers. Removal of the ortho-isomers from tolylene diamine is costly and presents an economic detriment to commercial operations. Furthermore, the polymerization of the o-tolylene diisocyanates is a slow process, and thus is a serious detriment to commercial operations wherein storage of the tolylene diisocyanate prior to use is essential. Therefore, formation of turbidity is a major quality problem encountered in commercial tolylene diisocyanates, and there is a need for efficiently and economically eliminating the formation of this turbidity.

Now it has been found in accordance with this invention that the problem of turbidity in tolylene diisocyanate can be eliminated by treating tolylene diisocyanates containing ortho-isomers with aluminum oxide, followed by distillation, to recover tolylene diisocyanates essentially free from ortho-, or vicinal, isomers. This process is readily adaptable to commercial operations and obviates the requirement of special equipment or costly materials.

While it is apparent that any mixture containing ortho-isomers of tolylene diisocyanate can be treated in accordance with this invention, the aforementioned commercial process wherein tolylene diamines are phosgenated to the corresponding diisocyanates is readily adaptable to the process described herein.

More in detail, it has been determined that the aluminum oxide functions as a selective polymerization catalyst for the ortho-isomers of tolylene diisocyanate to provide undistillable products from which the meta-tolylene diisocyanates are readily separated by distillation. Thus, o-tolylene diisocyanates polymerize in the presence of aluminum oxide in accordance with the following general equation.

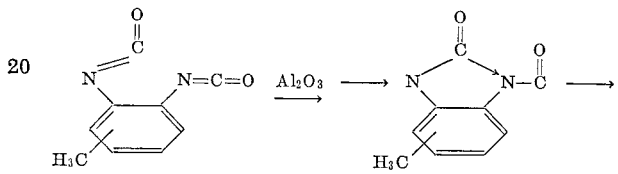

Any grade or type of aluminum oxide can be employed in the process of this invention. For example, technical grade anhydrous aluminum oxide, and small particle size aluminum oxide are excellent selective polymerization catalysts.

Generally, the aluminum oxide is employed in an amount between about 0.01 and about 10 percent, and preferably between about 0.1 and about 1.0 percent, by weight based on the total tolylene diisocyanate content of the mixture to be treated. However, lesser amounts can be employed if desired, and greater amounts can be employed where cost is not a factor.

After incorporating the aluminum oxide with the tolylene diisocyanate, the resulting mixture is distilled to remove the non-vicinal tolylene diisocyanates. The reaction to provide the non-distillable polymers of o-tolylene diisocyanate occurs prior to and/or during the distillation step. If desired, the mixture of tolylene diisocyanates containing the aluminum oxide can be heated prior to distillation; where this technique is employed, temperatures in the range of about 100–250° C. are utilized. Distillation can be carried out at atmospheric pressure or under reduced pressures; if desired, the mixture can be filtered prior to distillation to remove the aluminum oxide.

A particularly advantageous feature of the process of this invention is the effectiveness of the aluminum oxide catalyst upon reuse. Thus, in commercial operations, the catalyst is recovered and reused with no diminution of catalytic effectiveness, thereby enhancing the economic attractiveness of this process.

The following examples will serve to illustrate the separation of ortho-isomers from tolylene diisocyanate mixtures in accordance with the practice of this invention.

EXAMPLE 1

Tolylene diamine comprising about 94 percent meta- and about 4 percent ortho-tolylene diamines was dissolved in o-dichlorobenzene and charged to a reactor. After continuous phosgenation at 125–130° C. for about 2.5 hours, the reaction mixture was fed to a purge column. The excess phosgene and hydrogen chloride by-product were purged with nitrogen and the o-dichlorobenzene solvent removed by distillation. The bottoms were fed to an evaporator stripper and tolylene diisocyanate was removed by distillation at 180° C./20 mm. Hg, thereby insuring the retention in the distillation residue of any by-products formed during the phosgenation of the tolylene diamine.

A 0.5 ml. sample of the distillate was withdrawn and analyzed for ortho-isomers of tolylene diisocyanate by conversion to methylbenzimidazolones in the following manner. The sample was hydrolyzed with 15 ml. of concentrated hydrochloric acid at 180° C. in a pressure tube, and the resulting tolylene diamine hydrochloride removed by cation exchange. Ultraviolet spectroscopy of the eluant in a 3:1 isopropanol-water medium revealed a methylbenzimidazolone content of 0.26% corresponding to 0.30% by weight of ortho-tolylene diisocyanates.

Another sample, in the amount of 100 g., was withdrawn from the distillate, placed in a 3-necked flask, mixed with 0.5 g. of aluminum oxide Type A (dry powder, 0.3 micron particle size), and heated for about 3 hours at 170° C. Flash distillation at 125° C./0.21 mm. Hg provided tolylene diisocyanate having an undetectable ortho-isomers content (<.03%), as determined by the residue showed absorption at 5.65μ and 5.75μ, which is characteristic for the polymers formed from o-tolylene diisocyanates.

For purposes of comparison, a sample of the original distillate was heated and then distilled at 125° C./0.21 mm. Hg without treatment with aluminum oxide; the ortho-isomer content of this distillate was about 0.20% by weight.

EXAMPLE 2

Example 1 was repeated with the deletion of the heating treatment prior to distillation. After distillation at 170–180° C./20 mm. Hg, tolylene diisocyanate containing 0.03% by weight of o-tolylene diisocyanates was obtained.

EXAMPLES 3–9

Following the general procedure of Example 2, a series of samples of tolylene diisocyanate mixture containing 0.3% by weight of ortho-isomers were treated with aluminum oxide; the results are tabulated below. Where "reuse" is indicated, the catalyst of the preceding example was recovered and reused to show that the process can be used in a commercial operation where reuse of the catalyst is economically desirable.

TABLE

| Example | Aluminum oxide | Wt. percent aluminum oxide | Percent o-isocyanates after distillation, 170–180° C./20 mm. |
|---|---|---|---|
| 3 | Type A [1] | 0.2 | 0.08, 0.09 |
| 4 | Type A (reuse) | 0.2 | 0.07, 0.07 |
| 5 | do | 0.2 | 0.07, 0.08 |
| 6 | Anhydrous | 0.2 | 0.08, 0.06 |
| 7 | Anhydrous (reuse) | 0.2 | 0.06, 0.06 |
| 8 | do | 0.2 | 0.07, 0.07 |
| 9 | do | 0.2 | 0.06, 0.09 |

[1] Dry powder, 0.3 micron particle size.

We claim:
1. A process for separating ortho-isomers of tolylene diisocyanate from tolylene diisocyanate mixtures which comprises incorporating therewith aluminum oxide and distilling the mixture, thereby lowering the ortho-isomer content of the recovered tolylene diisocyanate distillate mixture.
2. The process of claim 1 wherein said mixture is heated at a temperature from about 100° to about 250° C. prior to distillation.
3. The process of claim 1 wherein between about 0.01 and about 10 percent by weight, based on total tolylene diisocyanate content, of said aluminum oxide is employed.
4. The process of claim 3 wherein between about 0.1 and about 1 percent by weight of said aluminum oxide is employed.

References Cited

UNITED STATES PATENTS 3,282,975  11/1966  Friedman et al. _____ 260—453
3,317,606  5/1967  Luberoff et al. _____ 260—453

WILBUR L. BASCOMB, Jr., Primary Examiner

U.S. Cl. X.R.
203—36; 260—453